United States Patent [19]

Coltrain et al.

[11] Patent Number: 5,190,698
[45] Date of Patent: Mar. 2, 1993

[54] POLY(ALKYLENE OXIDE)VINYL CARBOXYLIC ESTER CONTAINING POLYMER/INORGANIC OXIDE COMPOSITES AND METHODS OF MAKING

[75] Inventors: Bradley K. Coltrain; Neil T. Ferrar, both of Fairport; Christine J. T. Landry, Honeoye Falls; S. R. Turner, Pittsford, all of N.Y.

[73] Assignee: Eastman Kodak Company, Rochester, N.Y.

[21] Appl. No.: 685,319

[22] Filed: Apr. 15, 1991

[51] Int. Cl.$^5$ .............................................. W01B 1/06
[52] U.S. Cl. .................................. 252/518; 252/520; 252/521; 427/121; 427/389.9; 427/393.5; 524/413; 524/437; 524/430; 524/401; 524/80; 524/81; 526/317.1; 526/318.1; 526/318.41; 526/320; 526/321
[58] Field of Search ..................... 252/501.1, 518, 520, 252/521; 427/121, 389.9, 393.5; 428/510, 523, 526; 526/317.1, 318.1, 318.41, 320, 321; 524/401, 80, 81, 413, 437, 430

[56] References Cited

U.S. PATENT DOCUMENTS

| | | | |
|---|---|---|---|
| 3,822,232 | 7/1974 | Huang et al. | 260/31.2 MR |
| 3,904,572 | 9/1975 | Huang et al. | 260/31.2 MR |
| 3,960,805 | 6/1976 | Taylor | 260/37 N |
| 4,121,028 | 10/1978 | Marchessault et al. | 526/48.1 |
| 4,752,630 | 7/1988 | Sterbel et al. | 524/413 |
| 4,806,582 | 2/1989 | Boutillier et al. | 524/178 |
| 4,978,473 | 12/1990 | Kuroda et al. | 252/518 |

OTHER PUBLICATIONS

Weston D. et al., "Effects of A New Filler on the Mechanical and Electrochemical Properties of Lithium Salt-Poly (Ethylene Oxide) Polymer Electrodytes".
Cowie D. et al., "Ionic Conductivity of Poly(diethoxy(3)methylitaconate) contains Lithium Perchlorate".
Cowie & Ferguson, "J. Polymer Sci: Polymer Physics Edition", vol. 23, pp. 2181-2191 (1985).
Cowie & Cree, "Ann. Rev. Phys. Chem.", vol. 40, pp. 85-113 (1989).
Cowie & Martin, "Poly. Comm.", vol. 26(10), p. 298 (1985).
Bannister, Davies, Ward & McIntyre, "Polymer", vol. 25, pp. 1600-1602, (1984).
Weston & Steele, "Solid State Ionics", 1, 75 (1982).
Tonge & Shriver, Polymers for Electronic Applications, J. H. Lai ed., CRC Press, 1989, p. 157.

Primary Examiner—William R. Dixon, Jr.
Assistant Examiner—C. M. Bonner
Attorney, Agent, or Firm—J. Jeffrey Hawley

[57] ABSTRACT

There is disclosed a composite of 1) a polymer containing repeating units derived from a vinyl carboxylic ester having at least one organo terminated poly(alkylene oxide) side chain with the proviso that the poly(alkylene oxide) is present in an amount greater than 35 mole percent of the total of all backbone monomer units and alkylene oxide units in the polymer and 2) a metal oxide wherein the metal oxide comprises between about 1 and about 60 percent by weight of the composite. The composites can be made by a process comprising the steps of:

combining the described polymer and a metal oxide precursor in a solvent solution;
casting or coating the resulting solution onto a substrate;
curing the resulting sample to form a composite of the polymer and the metal oxide.

Optionally, the composite can be removed from the substrate to form a transparent free standing film. These composites have a variety of desirable properties. Optionally, a salt may be added to produce hard, abrasion resistant, transparent, antistatic coatings or films.

4 Claims, No Drawings

POLY(ALKYLENE OXIDE)VINYL CARBOXYLIC ESTER CONTAINING POLYMER/INORGANIC OXIDE COMPOSITES AND METHODS OF MAKING

FIELD OF THE INVENTION

This invention relates to composites of 1) a polymer containing repeating units derived from a vinyl carboxylic ester having at least one organo terminated poly(alkylene oxide) side chain with the proviso that the poly(alkylene oxide) is present in an amount greater than 35 mole percent of the total of all backbone monomer units and alkylene oxide units in the polymer and 2) a metal oxide. The composites are useful for forming clear coatings or films having high optical density. They are also useful as abrasion resistant coatings. By adding salts, abrasion resistant, antistatic coatings can be produced. The composites can be formed using a sol-gel process.

BACKGROUND OF THE INVENTION

Poly(acrylates) and poly(itaconates) with poly(alkylene oxide) (PAO) side chains are known in the art. (These polymers will be referred to as "vinyl carboxylic PAO ester polymers". If the alkylene is specified to be ethylene, then "PEO" will be used. see J. M. Cowie and Fergusen, J. Polymer Sci: Polymer Physics Edition, Vol. 23, pp. 2181-2191 (1985); J. M. Cowie and S. H. Cree, Ann. Rev. Phys. Chem., Vol. 40, pp. 85-113, (1989); and Cowie and Martin, Poly. Comm. Vol. 26(10), pg 298, (1985) D. J. Bannister, G. R. Davies, I. M. Ward, J. E. McIntyre, *Polymer*, vol., 25, pp. 1600-1602, 1984) It is also well-known that mixtures of vinyl carboxylic PEO ester polymers with simple inorganic salts results in materials with modest ionic conductivities. (Cowie and Martin cited above) However, the vinyl carboxylic PEO ester polymers have glass transition temperatures (Tg) ranging from about −60° C. upwards to about 0° C. With such low Tg's the polymers are quite tacky and exhibit very poor mechanical properties which limit their application. For example, if these compositions were to be used as antistatic layers on photographic elements that are rolled up upon themselves, they would be subject to a severe defect known as ferrotyping.

Alpha-alumina particles have been added to PAO (alkylene oxide) to improve its mechanical properties (J. E. Weston and B. C. H. Steele, Solid State Ionics, 1, 75 (1982). The addition of salt is known to increase the Tg's of the etheric acrylate polymers by as much as 86° C., depending upon the salt which is used. Unfortunately, the conductivities of the polymer-salt mixtures are dependent upon the polymer Tg, and decrease dramatically as the Tg is raised. (Cowie and Cree cited above and J. S. Tonge and D. F. Shriver, Polymers for Electronic Applications, J. H. Lai Edit. CRC Press, 1989, p. 157) This is believed to be due to retarded mobility of the ions in the polymer matrix as the glass transition temperature increases.

It would be desirable to produce polymeric composites of vinyl carboxylic PAO ester polymers which have low Tg's but with improved mechanical properties. This would extend the possibilities for using these materials in a variety of applications in which poly(alkylene oxide) units are desirable. High molecular weight PEO is a crystalline polymer which limits its transparency and ability to dissolve salts, and thus its use in, for example, optical applications as well as its use for ionic conductivity. The vinyl carboxylic PEO ester polymers are amorphous but have relatively large amounts of PEO linkages. Composite materials with alkylene oxide units which are amorphous but still have excellent mechanical properties would be highly desirable.

An additional advantage could be obtained if mechanical property improvement could be achieved without increasing the polymer Tg. In this case the addition of small amounts of salts would result in ionic conductive materials with improved mechanical properties. Such materials would be highly desirable for such applications as abrasion-resistant antistatic coatings.

Most antistatic coatings which rely on protonic conductors are sensitive to humidity. At low humidity, the conductivity of such antistatic compositions usually decreases. Antistatic compositions using electronic conductors such as vanadium pentoxide have conductivities that are humidity independent but are difficult to coat. Vanadium pentoxide, for example, must be coated in a ceramic type layer. It would be desirable to produce ionic compositions whose conductivity is less dependent on humidity.

The possible applications of composite materials would be further enhanced if the final composite is also transparent as this offers the possibility to use these materials for overcoats on optical components, for example.

SUMMARY OF THE INVENTION

In accordance with the present invention, there is provided a multicomponent composite of 1) a polymer containing repeating units derived from an vinyl carboxylic ester having at least one organo terminated poly(alkylene oxide) side chain with the proviso that the poly(alkylene oxide) is present in an amount greater than 35 mole percent of the total of all backbone monomer units and alkylene oxide units in the polymer and 2) a metal oxide, wherein said metal oxide comprises between about 1 and about 60 percent by weight of said composite.

The composites of the invention can be substantially optically clear, have improved mechanical properties compared to the polymer component of the composite and additionally can be made to have high refractive indices. Thus, the composites can be used in a variety of optical applications such as the support for optical elements, as protective coats, for waveguide applications, or for antistatic films or coatings if doped with the appropriate salt. The coatings are hard and are resistant to ferrotyping. Where doped with salt, the composites have conductivities that are relatively independent of humidity. Other applications of these composites can be in their use as membranes since they can easily be cast to form highly flexible, free standing films. Other uses will be apparent to those of skill in the art.

In accordance with another aspect of the invention, there is provided a method for making the composites described above. Thus, there is provided a process of forming a composite of 1) a polymer containing repeating units derived from an vinyl carboxylic ester having at least one organo terminated poly(alkylene oxide) side chain with the proviso that the poly(alkylene oxide) is present in an amount greater than 35 mole percent of the total of all backbone monomer units and alkylene oxide units in the polymer and 2) a metal oxide, said method comprising the steps of:

combining said polymer and a metal oxide precursor in a solvent solution;

casting or coating said solution onto a substrate;

curing the resulting sample to form a composite of said polymer having organo terminated poly(alkylene oxide) side chains and said metal oxide.

DETAILS OF THE INVENTION

One of the components of the composite of the invention is a polymer containing repeating units derived from an vinyl carboxylic ester having at least one organo terminated poly(alkylene oxide) side chain with the proviso that the poly(alkylene oxide) is present in an amount greater than 35 mole percent of the total of all backbone monomer units and alkylene oxide units in the polymer. This vinyl carboxylic PAO ester portion of the polymers can be represented by repeating units having the formula:

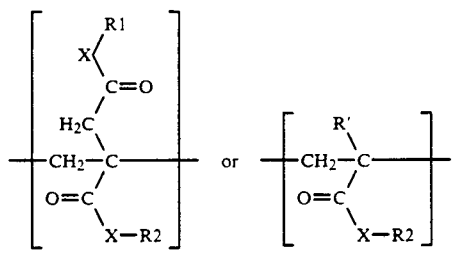

wherein least one of R1 and R2 represents -(R3-O)n-R4 where n is an integer from 0 to about 50 and the other of R1 and R2, as well as R' is independently selected from the group consisting of hydrogen, methyl and ethyl; and X is oxygen, nitrogen or sulfur.

In the units -(R3-O)n, each R3 is randomly selected from straight or branched chain alkylene, preferably having from 2 to about 4 carbon atoms in a chain between oxygen atoms. By "randomly straight or branched chain alkylene having from 2 to about 4 carbon atoms" it is meant that the R3 in each repeating (R3-O) unit present may be the same or different provided that each R3 contains from 2 to about 4 carbon atoms. In other words, there may be from 2 to about 4 carbon atoms between oxygen atoms. For example, where n=3, R1 could be —CH$_2$CH$_2$—O—CHCH$_3$CHCH$_3$—O—CH$_2$CHCH$_3$—O—R$_4$. Specific examples of R3 include ethylene, n-propylene, isopropylene and n-butylene.

R4 is selected from the group consisting of hydrogen, alkyl, alkenyl, haloalkyl, phenyl, substituted aromatic, typically from 1 to 18 carbon atoms. Suitable as R4 are substituted alkyl, alkenyl or aromatic groups containing from 1 to about 18 carbon atoms. Examples of substituents include halogen such as F, Cl, amino groups such as NH2, NHCH3, or N(CH3)2 and thio containing groups, such as alkylthio (e.g. methylthio, ethylthio and the like) or nitro or nitroaromatic groups. A preferred substituted R4 group is a terminally halogen substituted alkyl group such as perfluoroalkyl such as trifluoroethyl, pentafluoropropyl, heptafluorobutyl and trifluoromethyl sulfonates. Examples of R$_4$ include —CH$_3$, —CH$_2$CH$_3$, —CH$_2$CF$_3$, —CH$_2$CCl$_3$, —(CH$_2$)$_5$CH$_3$, —(CH$_2$)$_4$—CH=CH—CH$_3$, —CH$_2$—O—CH$_3$, and —(C$_6$H$_4$)—(C$_8$H$_{17}$).

In the above formula, as noted, X can be oxygen, nitrogen or sulfur. Oxygen containing polymers are shown in the examples. Where X is nitrogen or sulfur, the necessary methacrylamides and thioester monomers are readily prepared from known intermediates such as an amino or thiol terminated alkylene oxide oligomers.

These polymers can be made by the method disclosed in the various Cowie et al references discussed above. This process involves the preparation of the vinyl carboxylic ester monomer (more specifically an itaconate monomer) by the acid catalyzed esterification of itaconic acid with a PAO precursor alcohol to produce the desired ester monomer. In more detail, the itaconic acid can be esterified with the desired PAO precursor alcohol using p-toluene sulfonic acid as catalyst and toluene as solvent. The water that is formed can be removed using azeotropic distillation. Where the number of PAO repeating units n is 1 or 2, the ester that is thus formed can be purified by fractional vacuum distillation. For n of 3 to 50, the unreacted alcohol can be removed with a water wash to leave the desired monomer in the toluene solution.

Following these procedures leads to monomers wherein the majority of the monomer composition is disubstituted ester. That is, both of the itaconate side chains contain poly(alkylene oxide) esters. However, some of the monomer composition comprises monosubstituted ester. That is, only one of the side chains is esterified and the other remains in the acid form. This will be referred to as the "acid-ester". This acid-ester can be removed from the monomer composition by column chromatography.

Alternatively, useful monomers can be prepared using a transesterification method. This results in a monomer composition that has substantially no acid-ester component.

Additionally, acrylate monomers with poly(alkylene oxide) groups can be made by modification of the above procedures and are available commercially.

The desired polymers are prepared with the above described monomers as a starting material using an initiator such as azobisisobutyronitrile (AIBN) under nitrogen using conventional procedures.

Additionally, these vinyl carboxylic PAO ester monomers can be copolymerized with other α,β-ethylenically unsaturated monomers to produce polymers which are useful in the invention. Any such monomer can be used such as for example styrene. Particularly useful monomers of this type include acid units such as for example, itaconic acid, methyacrylic acid or acrylic acid. As will be discussed in more detail below, the presence of the acid functionality facilitates the formation of transparent composites. The amount of the additional α,β-ethylenically unsaturated monomers is limited by the requirement that the PAO portion of the vinyl carboxylic ester is present in an amount greater than about 35 mole percent of the total of all backbone monomer units and alkylene oxide units in the polymer. Thus for a poly(itaconate) polymer having PAO substitutions on both side chains, the mole percent PAO is about 90% assuming that the PAO chain is PEO with 6 ethylene oxide repeating units. Similarly, if the polymer is a methacrylate based polymer with one ethylene oxide side chain with one ethylene oxide repeating unit, the mole percent of PAO would be about 50%. That mole percent could be reduced further by copolymerizing the PAO containing methacrylate with another monomer that does not contain PAO.

A preferred method of the invention generally is carried out by dissolving 1) a polymer containing repeating units derived from vinyl carboxylic ester having at least one organo terminated poly(alkylene oxide) with the proviso that the poly(alkylene oxide) is present in an amount greater than 35 mole percent of the total of all backbone monomer units and alkylene oxide units in the polymer and 2) the metal oxide precursor in an organic solvent, such as alcohol and/or tetrahydrofuran, with stirring. Into the stirred solution of the polymer is added the solution of the metal oxide precursor, (such as titanium isopropoxide or n-butoxide). Hydrolysis of the solution (so as to produce a metal oxide from the precursor) can be carried out by atmospheric moisture, although acidic or basic water can also be added.

In an alternative method, the metal oxide precursors can be hydrolyzed prior to their addition to the polymer solution. The metal alkoxide is dissolved in an organic solvent such as tetrahydrofuran and a solution consisting of 1 molar equivalent water (based on the metal) and a small amount of concentrated HCl diluted in isopropanol is added slowly to it. The resulting solution can then be added directly to the polymer solution and castings or coatings can be made. This synthesis route to the composites will be referred to herein as the "prehydrolysis" method.

If polymers containing carboxylic acid groups are employed then homogeneous composites can be produced either by using the prehydrolysis method or by the direct addition of the metal alkoxides to the polymer solution. The carboxylic acid group can be on the vinyl carboxylic portion (for example if the itaconate is a monoester) or can be part of another monomer in a copolymer such as if the copolymer contains an acrylate group. If, on the other hand, polymers containing no acid functionalities are employed, then the direct addition of the metal alkoxides to the polymer solution will result in phase separated, opaque, composites. However, the prehydrolysis method will produce transparent, homogeneous composites with these polymers. The solution is then cast, or coated and cured at a temperature of up to about 200° C. The metal oxide precursor is thus converted to the desired metal oxide.

Another alternative to forming transparent composites is to add acid to the solution before casting or coating and curing. Sufficient acid is added so as to adjust the pH to about 1-4. Hydrochloric acid, acetic acid and p-toluene sulfonic acid are examples of useful acids.

The metal oxide precursor that forms the metal oxide in the composite of the invention may be derived from reactive inorganic monomers having a hydrolyzable leaving group that are soluble in the solvents for the vinyl carboxylic PAO ester containing polymer, and that are capable of forming a network via hydrolysis and condensation. The metal of the metal oxide may be defined as any electropositive chemical element characterized by ductility, malleability, luster, conductance of heat, and electricity, which can replace the hydrogen of an acid and forms bases with the hydroxyl radical. According to a particularly preferred embodiment, the oxides employed are silicon, titanium, aluminum or zirconium heteropolycondensates that have been prepared by hydrolysis and polycondensation of at least one monomer of the general formula $MX_3$ and $MX_4$ wherein X is hydrogen, halogen, alkoxy, aryloxy, carboxy, or an $-NR_2$ group, in which R is hydrogen and/or alkyl, and/or aryl with the proviso that not all of X are hydrogen, and M is a metal. Also suitable are binary or ternary heteropolycondensates which can contain other metals including boron, indium, tin, tantalum, lead, phosphorus, lanthanum, iron, copper, yttrium, and germanium. Barium and magnesium oxide mixtures with above metal oxides also may be utilized in the invention. The preferred substituted materials are titanium alkoxide, zirconium alkoxide, silicon alkoxide, and aluminum alkoxide. Particularly preferred are titanium isopropoxide (Ti(i-OPr)4), tetraethoxysilane (Si(O-Et)4), zirconium n-butoxide (Zr(OBu)4), titanium n-butoxide (Ti(OBu)4) and aluminum tri-sec-butoxide Al(OCH(CH3)C2H5)3.

The in situ hydrolysis and condensation of the metal oxide leads to incompletely formed metal oxides. This is due, at least in part, to the mild processing conditions used in these vinyl carboxylic poly(alkylene oxy) ester containing polymer composites. Thus, these composites are substantially different from simple mixtures wherein fully condensed oxides are simply mixed with the polymer. The difference can be easily determined by NMR and x-ray analysis. (L. W. Kelts, N. J. Effinger, S. M. Melpolder; J. Non-Crystalline Solids; Vol. 83, pp. 353-374, (1986); and A. D. Irwin, J. S. Holmgren, J. James; Materials Letters; Vol. 6 No. 1.2, pp. 25-30 (1987))

The compositions of the invention may contain other materials such as fillers or materials such as fire retardants or coating aids, antistatic compounds, or other polymers which are miscible with the vinyl carboxylic PAO ester containing polymer and which are compatible with the inorganic oxide. The composites of the invention can be typically transparent as all or substantially all of the domains of the metal oxide usually have a size of less than 2000 Angstroms and preferably less than 500 Angstroms for the strongest and most transparent materials. In some instances there may be impurities or other deliberately added components such as dyes or pigments that render the products non-transparent. The term "transparent" as used herein means that letter quality pica print on white paper can be read through a 0.5 cm thick layer of the composite material when formed in a layer.

The salts that are useful when forming conductive antistatic layers or films with the multicomponent composites in the present invention are those that can complex with the alkylene oxide side chains of the vinyl carboxylic PAO ester containing polymer. Any salt that complexes with alkylene oxide is useful. Whether a salt complexes with the alkylene oxide can be easily determined by methods known in the art, such as electrical conductivity measurements, differential scanning calorimetry (DSC) (measuring changes in glass transition temperature), vibrational spectroscopy, and nuclear magnetic resonance, or a combination thereof. Reference is made to Cowie and Martin cited above (see also the Bannister reference cited above).

A number of factors can be utilized to determine whether the salt will be likely to complex with the vinyl carboxylic PAO ester containing polymer. The greater the flexibility of the polymer backbone of the vinyl carboxylic PAO ester containing polymer, the more receptive it is to complexing with all salts. Similarly, the higher the concentration of polar groups in the vinyl carboxylic PAO ester containing polymer, the more receptive it is to complexing with all salts. Salts that have a greater solubility with the vinyl carboxylic PAO ester containing polymer will tend to complex with the vinyl carboxylic PAO ester containing polymer to a greater extent than salts with lower solubility. Salts with a low lattice energy tend to complex with the acrylate PAO ester containing polymer to a greater extent than salts with a high lattice energy. Salts with bulky anions tend to complex with the vinyl carboxylic PAO ester containing polymer to a greater extent than salts with smaller anions. Also, salts with lower valence charges (e.g., mono and divalent salts) tend to complex with the vinyl carboxylic PAO ester containing polymer to a greater extent than salts with greater valence charges (e.g. trivalent salts).

Preferred examples of salts useful in the invention include KCF3SO3, Ca(CF3SO3)2, Zn(BF4)2, LiBF4, NaCF3SO3, LiCF3SO3, KCF3CO2, LiCF3CO2, NaCF3CO2, KC3F7CO2, LiC3F7CO2, NaC3F7CO2, C4F9SO3K and KPF6. Other examples include NaB(C6H5)4, LiClO4, LiI, NaI, KI, KSCN, LiSCN and NaSCN. One skilled in the art could easily choose a number of additional salts according to the invention, given the salts exemplified above.

The temperature at which curing of the composites takes place may be any desired temperature that provides sufficient condensation of the materials utilized. Typical curing temperatures are between about 25° C. and 200° C.

The composites of the invention can take many forms. They can be cast on a surface to form a relatively thick self-supporting material that can be used, for example, as the support for an optical recording element or as a membrane. The composites can also be coated as a thin layer on an optical surface to provide protection and desirable optical properties.

The vinyl carboxylic PAO ester containing polymer and metal oxide used in the composite of the invention may be combined in any amounts that give a suitable layer or film. Typical of such combinations are those of between about 20% and about 95% by weight of the vinyl carboxylic PAO ester containing polymer combined with between about 5% and about 80% by weight of the metal oxide precursor. It has been found that an amount of between about 40 and about 60 weight percent of vinyl carboxylic PAO ester containing polymer in combination with between about 60 and about 40% by weight of the metal oxide precursor is suitable to give products of desirable strength.

The finished composite material after curing typically has a metal oxide content of between about 1 and about 60% by weight. The refractive index of the composite increases as the amount of inorganic oxide increases if the metal oxide has a higher refractive index than the polymer. At high oxide contents the layers or films become brittle and may fall apart when flexed or handled. Thus, spin-coating of the composite solution can provide an effective means of preparing films or coatings with high refractive indices. A preferred amount of metal oxide content is between about 10% and about 50% by weight to form a strong and continuous network of the metal oxide in the layers or films. The optimum amount of metal oxide for oxides of titanium, aluminum, silicon, and zirconium has been found to be between about 10% and about 30% by weight for the strongest and most flexible materials.

For the example below, poly(itaconate PEO esters) were prepared according to the previously cited method of Cowie et al by reacting monoalkylesters of ethylene glycols with itaconic acid. Following these procedures leads to copolymers in which the majority component is the disubstituted ester, but with some monosubstituted ester also formed. An example is also given using a commercially available poly(ethylene oxide) acrylate monomer.

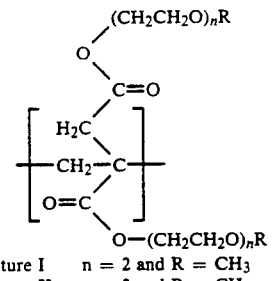

Structure I    n = 2 and R = CH3
Structure II   n = 3 and R = CH3
Structure III  n = 3 and R = CH2CH3

These polymers, essentially free of the acid-ester moiety (<1 mol %), can be prepared by employing column chromatography on the derivatized monomer prior to polymerization. In the absence of acid from an external source, the acid-ester functionality plays an important role in the formation of composites that are transparent. Thus, if an inorganic alkoxide is added to a polymer that is essentially free of the acid ester, the resulting film will be opaque. If the same preparation is carried out with a polymer containing some acid units, then a clear, flexible coating or free standing film can be produced. Of course, the addition of acidic water or the use of prehydrolyzed inorganic alkoxides will serve much the same role as the acid moiety in the polymer chain.

Itaconic acid, p-toluenesulfonic acid, and 3-tertbutyl-4-hydroxy-5-methylphenylsulfide were used as received. Azobis(2-methylpropionitrile) (AIBN) was recrystallized from methanol. 2-(2-methoxyethoxy)ethanol, triethylene glycol monomethylether and triethylene glycol monoethylether were distilled from themselves under vacuum.

Lithium triflate was added to the composite solution when decreased resistivity of the composite was desired. This salt was added in amounts between 10 to 25 weight percent based on the weight of the polymer.

The following examples are presented for a further understanding of the invention.

EXAMPLE 1

Composites of Structure I/Ti(OBu)4 (1/1)wt and I/Zr(OBu)4 (1/1)wt

Synthesis of Poly[bis{2-(2-methoxyethoxy)ethoxy}itaconate] without monoester incorporation (Structure IA) and with monoester incorporation (Structure IB). A 1 liter round bottom flask was charged with itaconic acid (150 g, 1.16 mol), 2-(2-methoxyethoxy)ethanol (292 mL, 2.45 mol), p-toluenesulfonic acid (2.0 g, 10.5 mmol), toluene (300 mL), and a magnetic stir bar. The flask was fitted with a receiver, placed into an oil bath and refluxed for 24 h, after which 41.3 mL of water was collected. The reaction was cooled and divided into two equal portions.

The toluene in the two fractions was removed under vacuum, the inhibitor 3-tertbutyl-4-hydroxy-5-methylphenylsulfide added to the crude product and the monomer purified by vacuum distillation, typically collecting the fraction at approximately 180° C. at 0.15 mm Hg. One fraction was then given the additional purification step by eluting with dichloromethane from a chromatographic column packed with basic alumina. Titration of the two monomers in tetrahydrofuran (THF) with hexadecyltrimethylammonium hydroxide in toluene showed that the aliquot that was not chromatographed contained 19.59 mole % of a free carboxylic acid. This was taken as a measurement of incomplete reaction during esterification leading to the monoester as a comonomer with the diester. In contrast, the chromatographed fraction contained only 0.26 mole % of the itaconic acid-ester.

Bulk polymerization was carried out on each sample in the same manner. A 250 mL, 3 neck round bottom flask fitted with a condenser, mechanical stirrer and an argon inlet adapter was charged with the etheric substituted monomer not previously chromatographed (60.8 g, 0.284 moles based on the diester) and AIBN (0.61 g, 3.7 mmol). The reaction was heated at 60° C. for 17 hours, the viscous product was dissolved in THF and precipitated into diethyl ether chilled in a dry ice-acetone bath to yield a clear tacky solid. Titration of the polymer showed that the monomer not chromatographed yielded 18.84 mole % carboxylic acid (Structure IB). The monomer that had been chromatographed (60.1 g, 0.281 mol) was polymerized using AIBN (0.60 g, 3.7 mmol) and yielded 0.18 mole % carboxylic acid by titration (Structure IA).

Composites of the polymer containing almost 19 mole % of the acid ester (Structure IB) with titanium and zirconium oxide were prepared by first dissolving the polymer in tetrahydrofuran to produce a polymer solution that was 10 % by weight polymer. About 5 grams of this solution was mixed with 0.5 mL of either Ti(OBu)4 or Zr(OBu)4-BuOH and the resulting solutions were cast on to an inert substrate (poly(ethylene)) in air. After standing overnight and removing from the substrate, transparent solid samples were obtained.

Dynamic mechanical thermal analysis (DMTA) showed a Tg for an itaconate PEO ester containing polymer/Ti(OBu)4 (60:40)wt composite of about $-20°$ C. and a plateau modulus, above the Tg, of $5 \times 10^8$ dynes/cm$^2$. A (1:1)wt composite of Structure IB with Ti(OBu)4 had a refractive index of about 1.59. In sharp contrast, composites prepared in the same manner with the polymer containing <1 mole % acid-ester (Structure IA) were opaque.

EXAMPLE 2

Coatings of Structure I/Ti(OBu)4 (½)wt and I/Zr(OBu)4 (½)wt 1.0 g of the polymer Structure IB was dissolved in 10 mL of methanol in a 50 mL Erlenmeyer flask and stirred with a magnetic stirrer. 2.0 g of Ti(OBu)4 was added to the stirred solution yielding a (1:2)wt composite solution, followed by the addition of 200 mg of lithium triflate. The solution was coated onto cellulose acetate and dried. The resulting composite was transparent yellow and showed no tendency to ferrotype. The surface resistivity of the coating at 50% relative humidity (RH) was 11.4 log ohm/sq. Coatings prepared with Zr(OBu)4-BuOH were only slightly yellow and had a surface resistivity of 11.1 log ohm/sq. In contrast, attempts to prepare coatings using the same procedure but with the polymers that did not contain >1 mole % acid-ester (Structure IA) resulted in opaque films. This was taken as evidence for phase separation of the oxide and the polymer.

EXAMPLE 3

Composites of Structure I/Ti(i-OPr)4 (1/1)wt using prehydrolyzed alkoxide

A stock solution was prepared by mixing 5 g of Ti(i-OPr)4 with 5 g of THF. To this solution was added a solution containing 20 g of isopropanol, 0.6 mL H$_2$O and 0.1 mL of 10N HCl. This will be referred to as solution A.

0.5 g of a 20 wt % solution of Structure IB in THF was mixed with 0.6 g of solution A (This corresponds to a 1:1 weight ratio of the polyitaconate ester/Ti(i-OPr)4). The mixture was cast and dried. This resulted in a clear, somewhat yellow free standing film that could be removed from the substrate onto which it was cast.

EXAMPLE 4

Composites of Structure I/Ti(i-OPr)4 (½)wt using prehydrolyzed alkoxide 1.2 g of the stock solution A was mixed with 0.5 g of the 20 wt % solution of Structure 1B in THF. (This corresponds to a 1:2 weight ratio of the polyitaconate ester/Ti(i-OPr)4). The mixture was cast and dried and resulted in a clear yellow free standing film that could be removed from the substrate onto which it was cast.

EXAMPLE 5

Composites were prepared in a similar manner as described for Example 3 using the poly(itaconate PEO ester) of structure 1A in place of structure 1B. These also resulted in clear, somewhat yellow free standing films.

EXAMPLE 6

Composites were prepared in a similar manner as described for Example 4 using the poly(itaconate PEO ester) of structure 1A in place of structure 1B. These also resulted in clear, somewhat yellow free standing films.

EXAMPLE 7

Composites of Structure I/Si(OEt)4 (1/1)wt using prehydrolyzed alkoxide.

Stock solution B was prepared by mixing 5 g of Si(OEt)4, 5 g of THF and 1.8 g 0.15M HCl. 0.5 g of the 20 wt % solution of structure 1A (or Structure IB) in THF was mixed with 0.24 g of stock solution B. This corresponded to a 1:1 wt ratio of the poly(itaconate ester)/Si(OEt)4. The composite solution was cast, dried and gave a clear free standing film. DMTA of this composite film showed a plateau modulus, above Tg, of about $1 \times 10^8$ dynes/cm$^2$.

EXAMPLE 8

Composites of Structure I/Si(OEt)4 (½)wt using prehydrolyzed alkoxide 0.5 g of the 20 wt % solution of structure 1A (or Structure IB) in THF was mixed with 0.48 g of stock solution B. This corresponded to a 1:2 wt ratio of the poly(itaconate ester)/Si(OEt)4. The composite solution was cast, dried and gave a clear free standing film. DMTA of this composite film showed a plateau modulus, above Tg, of about $1 \times 10^9$ dynes/cm$^2$.

EXAMPLE 9

Coatings of Structure II/Ti(OBu)4 (½)wt

Synthesis of Poly[bis(triethylene-glycol-monomethylether)itaconate] without (Structure IIA) and with monoester incorporation (Structure IIB). The synthesis of this polymer was carried out following the same general procedure as described for the previous polymer with the following modifications. The esterification was carried out with itaconic acid (30.37 g, 0.233 mol), triethylene-glycol-monomethylether (81 g, 0.49 mol), p-toluenesulfonic acid (1.04 g, 5.5 mmol) in toluene (100 mL). The toluene was removed and the monomer was divided into three unequal parts.

One fraction was eluted with dichloromethane from a chromatographic column packed with basic alumina. Polymerization of this monomer (42.3 g, 0.102 mol) was initiated with AIBN (0.21 g, 1.3 mmol). Titration indicated 0.42 mol % of the monoester in the polymer (Structure IIA). A second fraction was eluted with dichloromethane from a chromatographic column packed with acidic alumina. Polymerization of this monomer (26.3 g, 0.064 mol) was initiated with AIBN (0.13 g, 0.8 mmol). Titration indicated 1.03 mol % of the polymer was the monoester (Structure IIA). The third fraction was of "crude" monomer (15.0 g, 0.036 mol) initiated with AIBN (0.075 g, 0.5 mmol). Titration indicated 15.8 mol % of the itaconate repeat units contained monoester (Structure IIB). The Tg of this polymer was approximately $-70°$ C. as measured by differential scanning calorimetry (DSC).

Coatings prepared on cellulose acetate from a formulation of the unchromatographed material with Ti(OBu)4 (1:2)wt and salt were transparent and showed no tendency to ferrotype. Specifically, 1.0 g of the polymer Structure IIB was dissolved in 10 mL of methanol in a 50 mL flask and stirred with a magnetic stirrer. 2.0 g of Ti(OBu)4 was added to the stirred solution, followed by the addition of 200 mg of lithium triflate and 12 mg of a siloxane as a lubricant. The casting after drying was transparent. The surface resistivity of the coating was 8.63 log ohm/sq. In contrast, attempts to prepare coatings using the same procedure but with either of the polymers of Sample IIA resulted in opaque films. This was taken as evidence for phase separation of the oxide and the polymer.

EXAMPLE 10

Coatings of Structure III/Ti(OBu)4 (½)wt

Synthesis of Poly[bis(triethylene-glycol-monoethylether)itaconate] with monoester incorporation (Structure IIIB). The synthesis of this polymer was carried out following the same general procedure as described for the first polymer with the following modifications. The esterification was carried out with itaconic acid (30.0 g, 0.231 mol), triethylene-glycol-monoethylether (85.7 g, 0.481 mol), p-toluenesulfonic acid (0.96 g, 5.0 mmol) in toluene (100 mL). The solvent was removed under reduced pressure, the product dissolved in dichloromethane (100 mL), washed with water (5×100 mL), dried over magnesium sulfate and finally placed in vacuum to remove volatiles. The etheric itaconate monomer (20.0 g, 0.045 mol) was polymerized using AIBN (0.10 g, 0.6 mmol) and the polymer was isolated after dialysis against water to yield 15 g of product. Titration indicated 6.3 mol % of the itaconate repeat units contained monoester.

Coatings prepared on cellulose acetate from a formulation of the unchromatographed material with Ti(OBu)4 (1:2)wt and salt were transparent and showed no tendency to ferrotype. Specifically, 1.0 g of the polymer was dissolved in 20 mL of methanol in a 50 mL Erlenmeyer flask and stirred with a magnetic stirrer. 2.0 g of Ti(OBu)4 was added to the stirred solution, followed by the addition of 200 mg of lithium triflate and 7 mg of a siloxane as a lubricant. The coating formed after drying was transparent. The surface resistivity of the coating was 9.4 log ohm/sq.

EXAMPLE 11

Example 1 was repeated except that instead of the poly(itaconate) homopolymer, a copolymer of Structure I (85 mole %) and acrylate (15 mole %) was used. A clear composite containing titanium oxide was produced.

EXAMPLE 12

Methoxyethoxyethylmethacrylate (MEEMm) was purchased commercially and was eluted through a column to remove inhibitor. Into a 250 ml, 3 necked, round bottom flask equipped with a mechanical stirrer were placed 25 g of MEEMm and 125 g of dry tetrahydrofuran (THF). The mixture was degassed with argon and 0.11 g of AIBN was added. The flask was allowed to cool and the polymer precipitated by pouring diethyl ether into the flask, with stirring, while cooling in a dry ice/isopropanol bath. The ether was decanted and the precipitate dissolved in THF, filtered and the THF was removed in a rotary evaporator. The polymer was then dried in vacuo. A 10% solution of this polymer was prepared in THF. 10 g of this polymer solution was placed in a 50 ml flask and 0.60 g of titanium butoxide was added. When homogeneous, the resulting solution was cast, as previously described, to produce a free standing, yellow, opaque film.

The invention has been described in detail with particular reference to preferred embodiments thereof, but it will be understood that variations and modifications can be effected within the spirit and scope of the invention.

We claim:

1. A process of forming a composite having between about one to about 60 weight percent of metal oxide of 1) a polymer containing repeating units derived from a vinyl carboxylic ester having at least one organo terminated poly(alkylene oxide) side chain with the proviso that the poly(alkylene oxide) is present in an amount greater than 35 mole percent of the total of all backbone monomer units and alkylene oxide units in the polymer wherein said polymer can be represented by repeating units having the formula:

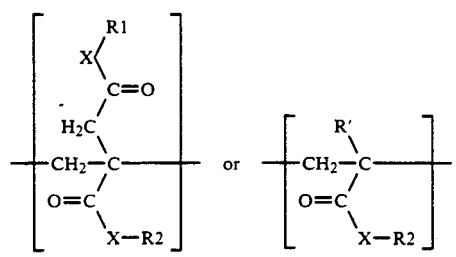

wherein at least one of $R^1$ and $R^2$ represents $-(R3\text{-}O)_n\text{-}R4$ wherein n is an integer from 0 to about 50 and the other of $R^1$ and $R^2$, as well as $R'$ is independently selected from the group consisting of hydrogen, methyl and ethyl; X is oxygen, nitrogen or sulfur;

wherein in the units $-(R3\text{-}O)n\text{-}R4$, each $R^3$ is randomly selected from straight or branched chain alkylene having from 2 to 4 carbon atoms, and $R^4$ is selected from the group consisting of hydrogen, alkyl, alkyenyl, haloalkyl, phenyl and substituted aromatic wherein said substituents are selected from the group consisting of halogen; amino groups; thio containing groups; nitro or nitroaromatic group; and terminally halogen substituted alkyl groups;

and 2) a metal oxide, said method comprising the steps of:

combining said polymer and a metal oxide precursor in a solvent solution;

casting or coating said solution into a substrate;

curing the resulting sample to form a composite of said polymer having organo terminated poly-(alkylene oxide) side chains and said metal oxide.

2. The process according to claim 1 wherein said step of combining said polymer and a metal oxide precursor in a solvent solution is accomplished by the steps of:

a) dissolving a metal alkoxide in an organic solvent to form a metal alkoxide solution;

b) adding to said metal alkoxide solution an organic solvent solution containing a small amount of water and acid in an amount sufficient to hydrolyze said metal alkoxide thereby forming a metal oxide solution; and c) adding said metal alkoxide solution to an organic solvent solution of said poly(vinyl carboxylic ester).

3. The process according to claim 2 wherein said polymer contains no acid functionalities and the composite that is produced is transparent.

4. A process according to claim 1 wherein said solvent solution further comprises a salt that complexes with alkylene oxide.

* * * * *